US008241084B2

(12) United States Patent
Todokoro (10) Patent No.: US 8,241,084 B2
(45) Date of Patent: Aug. 14, 2012

(54) INTELLECTUAL TRAINING TOY (75) Inventor: Shinji Todokoro, Tokyo (JP)

(73) Assignee: Agatsuma Co., Ltd., Tokyo (JP)

( * ) Notice: Subject to any disclaimer, the term of this patent is extended or adjusted under 35 U.S.C. 154(b) by 450 days.

(21) Appl. No.: 12/619,796

(22) Filed: Nov. 17, 2009

(65) Prior Publication Data

US 2010/0124866 A1      May 20, 2010

(30) Foreign Application Priority Data

Nov. 18, 2008    (JP) .................................. 2008-294652

(51) Int. Cl.
*A63H 30/00* (2006.01)
(52) U.S. Cl. .......................... 446/175; 446/484; 446/491
(58) Field of Classification Search .................. 446/175, 446/268, 397, 484, 491, 9–13; 434/107, 434/110, 109; 453/3, 5, 9; 273/138.3
See application file for complete search history.

(56) References Cited

U.S. PATENT DOCUMENTS

| 4,998,611 | A | * | 3/1991 | Shuie | 194/337 |
| 5,122,093 | A | * | 6/1992 | Perkitny | 453/13 |
| 5,304,084 | A | * | 4/1994 | Liao | 446/9 |
| 5,451,178 | A | * | 9/1995 | Yorozu et al. | 446/175 |
| 6,877,096 | B1 | * | 4/2005 | Chung et al. | 713/185 |
| 6,896,573 | B1 | * | 5/2005 | Rogers | 446/8 |
| 2005/0095948 | A1 | * | 5/2005 | Snyder et al. | 446/175 |
| 2007/0018407 | A1 | * | 1/2007 | Shoemaker | 273/356 |

* cited by examiner

*Primary Examiner* — Dmitry Suhol
*Assistant Examiner* — Alex F. R. P. Rada, II
(74) *Attorney, Agent, or Firm* — The Marbury Law Group PLLC (57) ABSTRACT The invention provides an intellectual training toy with more elaborate idea which comprises disks 12 having an identification portion 20 and a toy main body 40 into which the disks 12 are inserted for use, the toy main body 40 comprising an insertion port switch 44 for detecting the insertion of the disks 12, an identification unit 70 for identifying the identification portions 20 of the disks 12, a sound storage unit for storing a plurality of voice signals which produce a voiced question and a voiced answer and music, a sound output unit for outputting voiced information and music, a disk discharge unit 54 for discharging the disks from the toy main body 40, a discharge port switch 62 for outputting a discharge signal when the disk discharge unit 54 is activated, and a control unit for reading out corresponding voice signals to output the voice signals so readout to the sound output unit.

7 Claims, 7 Drawing Sheets

|  | A | B | C | D | E | F |
|---|---|---|---|---|---|---|
| CAT | × | ○ | ○ | ○ | ○ | ○ |
| GOAT | ○ | × | ○ | ○ | ○ | ○ |
| DOG | ○ | ○ | × | ○ | ○ | ○ |
| HORSE | ○ | ○ | ○ | × | ○ | ○ |
| ELEPHANT | ○ | ○ | ○ | ○ | × | ○ |
| MOUSE | ○ | ○ | ○ | ○ | ○ | × |
| MONKEY | × | ○ | ○ | × | ○ | ○ |
| PIG | ○ | × | ○ | ○ | × | ○ |
| COW | ○ | ○ | × | ○ | ○ | × |

INTELLECTUAL TRAINING TOY

CROSS-REFERENCE TO RELATED APPLICATIONS

This application is based upon and claims the benefit of priority from the prior Japanese Patent Application No. 2008-294652 filed on Nov. 18, 2008, the entire contents of which, including the description, claims, drawings, and abstract thereof, are incorporated herein by reference.

BACKGROUND OF THE INVENTION

1. Field of the Invention

The present invention relates to an intellectual training toy with which a player can be trained intellectually through intellectual training plays which employ voiced questions, music played and voiced outputs in relation to pictures on disks, which are inserted to activate the intellectual training toy for play.

2. Description of the Related Art

The applicant of this patent application has invented an intellectual training toy having many intellectual training modes. This intellectual training toy, which was disclosed in Japanese Unexamined Patent Publication No. 2008-212240, has a toy main body which is made up of a base portion and an upper lid which is connected to the base portion so as to be opened and closed. A player places a basic sheet for a basic intellectual training play on the base portion of the toy main body and places further a replaceable sheet on the basic sheet. The sheets so placed are then identified and intellectual trainings corresponding to the sheets so placed can be performed.

An object of the invention is to provide an intellectual training toy with more elaborate idea.

SUMMARY OF THE INVENTION

An intellectual training toy according to the invention is made up of disks having an identification portion and a toy main body into which a player inserts the disks for play. This toy main body includes an insertion port into which the disks are inserted, a sloping path making up an inclined surface along which the disks are allowed to roll down while being erected, a holding plate formed at a lowest position of the sloping path for holding the disks, and a discharge port through which the disks are discharged from the toy main body. The toy main body includes further an insertion port switch for detecting the insertion of the disks to output insertion signals, an identification unit for identifying the identification portions of the disks to output identification signals, a sound storage unit for storing a plurality of voice signals which produce voiced questions and voiced answers and music, a sound output unit for outputting voiced information and music, a disk discharge unit for discharging the disks from the toy main body, a discharge port switch for outputting a discharge signal when the disk discharge unit is activated, and a control unit for reading out required voice signals based on the insertion signals, identification signals and discharge signals from the sound storage unit to output the voice signals so readout to the sound output unit.

The disks each include outer cylindrical elements which have a hollow portion, which are formed into a coin-like shape, and which have light transmission properties, a thin disk-like inner plate which is accommodated in the hollow portions of the outer cylindrical elements and which is pivoted so as to rotate in an interior space defined by the outer cylindrical elements, and a weight which is secured to an outer edge of the inner plate and which is located in a lower position of a rotating shaft of the inner plate to thereby suppress the rotation of the disk.

A picture or pictures are shown on one side or both sides of the inner plate.

Recesses and projections are formed on an outermost edge of the inner plate to make up an identification portion.

Further, the outermost edge of the inner plate may be colored to make up an identification portion.

The inner plate has identification portions on outermost edges of both a right-hand semi-circular edge portion and a left-hand semi-circular edge portion thereof.

According to the invention, the intellectual training toy with more elaborate idea can be provided in which by the disk being inserted into the toy main body, a voiced question corresponding to the disk so inserted is outputted from the toy main body, and when the disk discharge unit provided in the toy main body is activated, music, fake or imitation sounds, or animals' notes are outputted from the toy main body as a voiced answer to the voiced question.

According to the invention, the rotation of the inner plate inside the disk can be suppressed by the weight secured to the outer edge of the inner plate, whereby the inner plate can be held in one orientation at all times.

Further, according to the invention, by the pictures being shown on one or both sides of the inner plates, more elaborate plays can be played by the player.

According to the invention, by the recesses and projections being formed on the outermost edges of the inner plates to make up the identification portions thereof, the inner plates can individually be identified based on the recesses and projections which are formed thereon.

According to the invention, by the outermost edges of the inner plates being colored to make up the identification portions thereof, the inner plates can individually identified by identifying the colors of the colored outermost edges thereof.

According to the invention, by the identifications being provided on the outermost edges of both the right-hand semi-circular edge portions and the left-hand semi-circular edge portions of the inner plates, both sides of the inner plates can be used.

DETAILED DESCRIPTION OF THE PREFERRED EMBODIMENT

An intellectual training toy 10 according to the invention is made up of disks 12 having identification portions 20 and a toy main body 40 which is used by inserting the disks 12 thereinto. The toy main body 40 includes an insertion port 42 into which the disks 12 are inserted, sloping paths making up inclined surfaces along which the disks 12 are allowed to roll down while being erected, a holding plate 60 formed in a lowest position of the sloping paths for holding the disks 12, and a discharge port 72 through which the disks 12 are discharged from the toy main body 40. The toy main body 40 includes further an insertion port switch 44 for detecting the insertion of the disks 12 to output insertion signals, an identification unit 70 for identifying the identification portions 20 of the disks 12 to output identification signals, a sound storage unit for storing a plurality of voice signals which produce voiced questions and voiced answers and music, a sound output unit for outputting voiced information and music, a disk discharge unit 54 for discharging the disks 12 from the toy main body 40, a discharge port switch 62 for outputting a discharge signal as the disk discharge unit 54 is activated, and a control unit for reading out corresponding required voice signals from the sound storage unit based on the insertion signals, identification signals and discharge signals to output the voice signals so readout to the sound output unit.

The disks 12 are each made up of outer cylindrical elements 14 which have a hollow portion, which are formed into a coin-like shape, and which have light transmission properties, a thin disk-like inner plate 16 which is accommodated in the hollow portions of the outer cylindrical elements 14 and which is pivotally supported so as to rotate in an interior space defined by the outer cylindrical elements 14, and a weight 24 which is secured to an outer edge of the inner plate 16 so as to suppress the rotation of the inner plate 16. A picture or pictures are shown on one or both sides of the inner plate 16, and identification portions 20 are formed on both outermost edges of a right-hand semi-circular edge portion and a left-hand semi-circular edge portion of the inner plate 16.

Recesses and projections may be formed on the outermost edge of the inner plate 16 to make up the identification portion 20. Alternatively, the outermost edge of the inner plate 16 may be colored to make up the identification portion 20.

Figure 1:
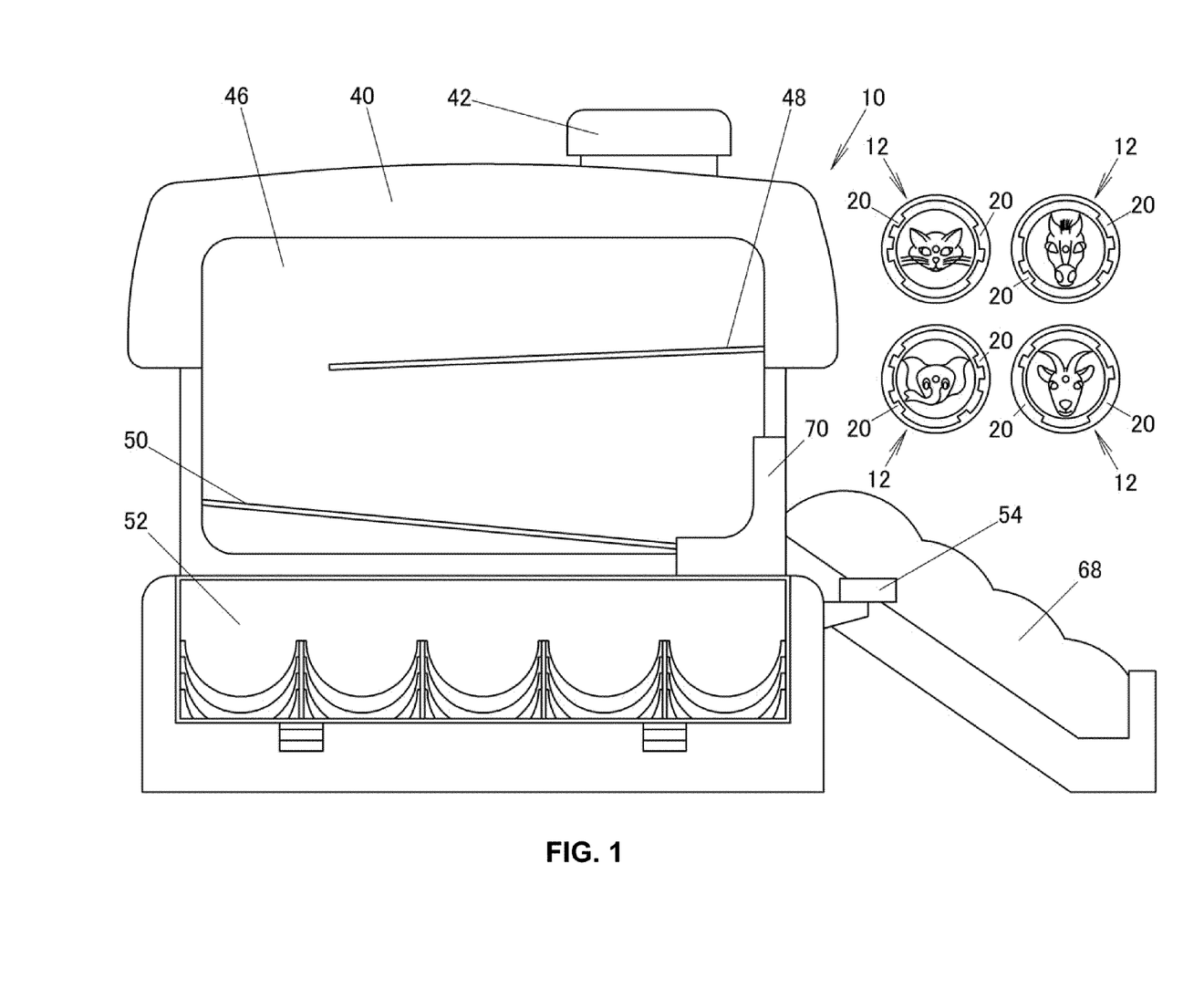
FIG. 1 is an external view of an intellectual training toy according to the invention.

Hereinafter, a mode for carrying out the invention will be described by reference to the drawings. FIG. 1 shows an external appearance of an intellectual training toy 10 according to an embodiment of the invention.

As is shown in FIG. 1, the intellectual training toy 10 is made up of a plurality of disks 12 and a toy main body 40. To briefly describe this intellectual training toy 10, in the intellectual training toy 10, when the disk 12 is inserted into an insertion port 42 provided at an upper portion of the toy main body 40, music or voice is outputted from the toy main body 40, and the disk 12 so inserted is designed to roll down along sloping paths formed within the toy main body 40. When the disk 12 reaches a lowest position of the sloping paths which make up inclined surfaces in the toy main body 40, the disk 12 is identified by an identification unit 70 provided in the toy main body 40, whereby a voiced question corresponding to the disk 12 is outputted from the toy main body 40. Thereafter, when a disk discharge unit 54 provided in the toy main body 40 is operated, a voiced answer corresponding to the disk 12 is outputted, and the disk 12 is discharged to a discharge path 68 provided on a right-hand side of the toy main body 40.

A player who plays with this intellectual training toy 10 can play by listening to a voiced question which is outputted in accordance with the disk 12 inserted and listening to a required voiced answer which corresponds to the voiced question by operating the disk discharge unit 54, and with this intellectual training toy 10, the player can play an intellectual training play by thinking of an answer to the voiced question while guessing a picture, a note of an animal, or a fake or imitation sound which corresponds to the voiced question, and getting to know whether or not the answer he or she has thought of is correct by listening to a voiced answer to the voiced question.

The disk 12 will be described by the use of the exploded perspective view of the disk 12 shown in FIG. 2. The disk 12 to be used in the intellectual training toy 10 is made up of outer cylindrical elements 14, an inner plate 16, a weight 24, a disk shaft 26, and a picture sheet 28. When the disk 12, which has a disk shape, is rolled, the inner plate 16 inside the disk 12 can hold a constant orientation at all times by the action of the weight 24, and the disk 12 is allowed to roll down with the picture sheet 28 which is affixed to the inner plate 16 oriented properly.

The outer cylindrical element 14, which makes up an outer casing of the disk 12, is made of a resin material having light transmission properties into a coin-like shape, and a hollow portion is formed in an interior of the outer cylindrical element 14. The inner plate 16, which is situated in the interior space defined by the outer cylindrical elements 14 and is formed into a thin disk shape, has a shaft hole 18 formed in a center thereof for pivotally supporting the disk shaft 26. The inner plate 16 also has identification portions 20 on both a right-hand semi-circular edge portion and a left-hand semi-circular edge portion thereof. In this identification portion 20, cutouts are formed along the outermost edge of the inner plate 16 to form recesses and projections therealong so as to make up the identification portion 20. A hole 22 is formed on a lower outer edge of the inner plate 16 for the weight 24 to be secured in place therein.

The weight 24, which is fitted in the hole 22 formed on the lower outer edge of the inner plate 16, is formed of a metallic material and has a disk-like shape.

The disk shaft 26 is fixed to central positions on inner sides of the outer cylindrical elements 14 and accommodates the inner plate 16 in the hollow portions thereof so as to rotate freely therein.

Further, the picture sheet 28 is a circular sheet, and a picture of an animal, a vehicle, a character, an article, a human being, a landscape, or a building is shown in the center thereof. This picture sheet 28 is affixed centrally to one side or both sides of the inner plate 16, and when picture sheets 28 are affixed to both sides of the inner plate 16, picture sheets 28 having different pictures are affixed to both the sides of the inner plate. By this, when the disk 12 is inserted into the insertion port 42 of the toy main body 40, in the event that the disk 12 is inserted with a desired side of the disk 12 oriented to the front, a voice or music is produced as required, and when the disk 12 reaches the lowest position of the sloping paths, a required voice or sound such as a voiced question or music which corresponds to the picture shown on the side of the disk 12 is outputted.

Although the picture sheets 28 of the embodiment show pictures of animals, in addition to these pictures, the picture sheets 28 may show Japanese Hiragana characters such as "a," "i," and "u" when they are phonetically expressed, alphabets such as "A," "B," and "C" or English words such as "apple" or Japanese Kanji characters and words such as "one," "two," "father," and "mother" when they are translated into English. Namely, with the disks 12 having affixed thereto the picture sheets 28 showing pictures, intellectual training plays can be played in which pictures are guessed, notes of animals are guessed or fake or imitation sounds are guessed, whereas with the disks 12 having affixed thereto the picture sheets 28 which shoe characters or words, intellectual training plays can be played in which characters or words are guessed.

Figure 3:
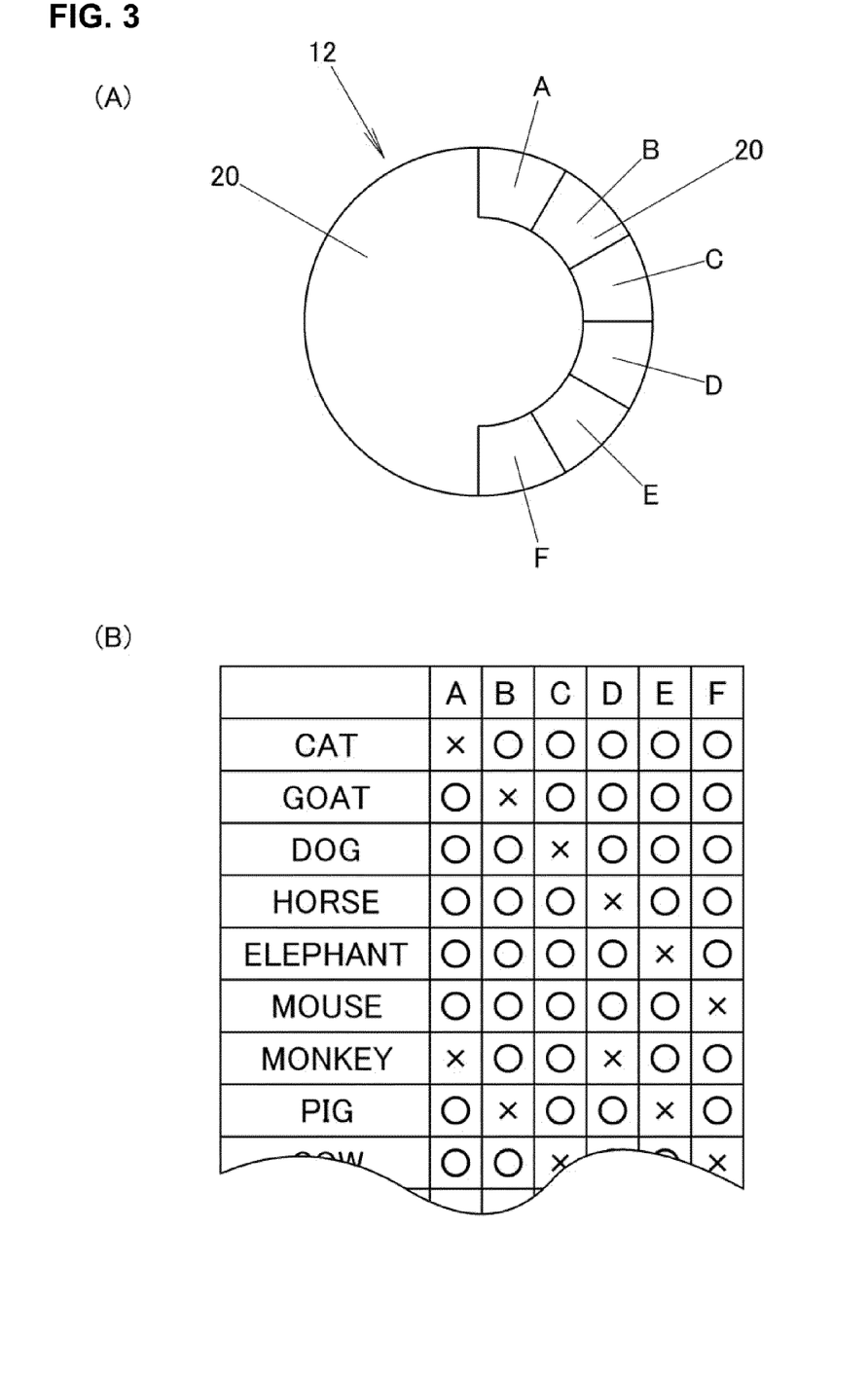
FIG. 3 shows diagrams explaining an identification portion of the disk of the intellectual training toy according to the invention.

Next, the details of the identification portions 20 provided on the disk 12 will be described using FIG. 3. The identification portions 20 are provided both on the right-hand semi-circular edge portion and the left-hand semi-circular edge portion of the disk 12, so that both the sides of the disk 12 can be used. In this embodiment, when facing square the front side of the disk 12, the identification portion 20 provided on the right-hand semi-circular edge portion is one to be identified, and when the disk 12 is inserted with the rear side thereof oriented towards the front, the identification portion 20 which lies on the left-hand semi-circular edge portion of the disk 12 originally or when the disk 12 is seen from the front thereof is then situated on the right-hand semi-circular edge portion of the disk 12 so reversed or turned over, which enables the identification of the disk 12.

Figure 2:
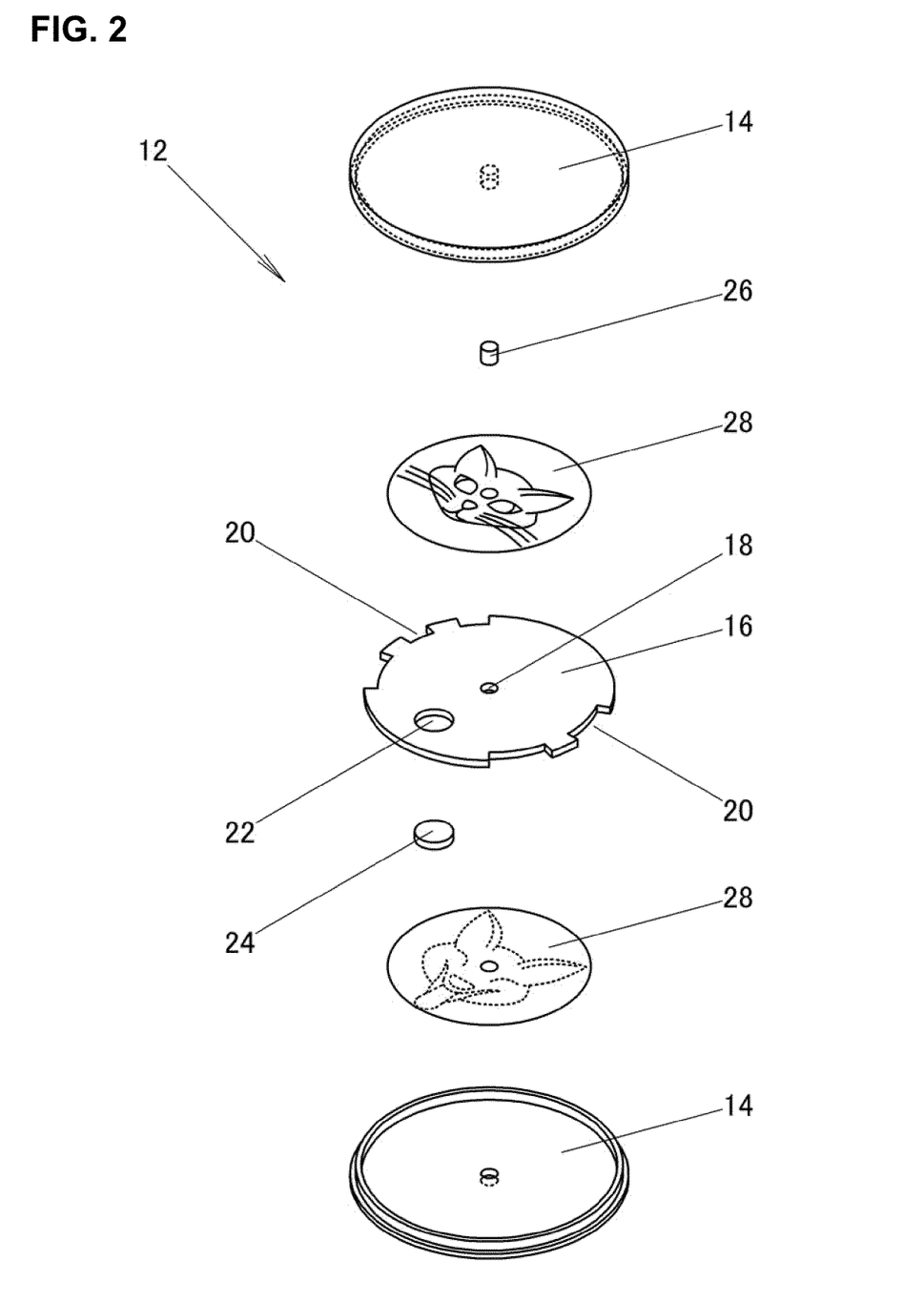
FIG. 2 is an exploded perspective view of a disk for use in the intellectual training toy according to the invention.

The identification portion 20 of the disk 12 is made up of a combination of recesses and projections which are formed by dividing the right-hand semi-circular edge portion into six areas A to F, as is shown in FIG. 3A, and making cutouts therein, as is shown in FIG. 2. By this, although the disks 12 can be identified in 64 ways through combinations of recesses and projections of 6 bits, in this embodiment, an identification portion 20 made up of a combination of recesses only and an identification portion 20 made up of a combination of projections only are excluded, and hence, a maximum of 62 combinations of recesses and projections can be used.

Since the identification portions 20 which have the different combinations of recesses and projections are provided on both the sides of each disk 12, a maximum of 31 disks 12 can be used in the intellectual training toy 10, so as to play 62 intellectual training plays. Note that in this intellectual training toy 10, 25 disks 12 are used to play 50 different intellectual training plays.

In addition, in the intellectual training toy 10 of this embodiment, as is shown in FIG. 3B, in order to identify a "cat" shown on the picture sheet 28, an identification pattern matching the cat becomes "x○○○○○" and when it is expressed by a combination of recesses and projections, the pattern becomes a combination of "one recess and five projections." Namely, in the event that the outermost edge of the disk 12 is cut out in such a manner that a recess is formed only in the area A in FIG. 3A, the disk 12 is identified as denoting the "cat" by the identification unit 70 in the toy main body 40.

Figure 4:
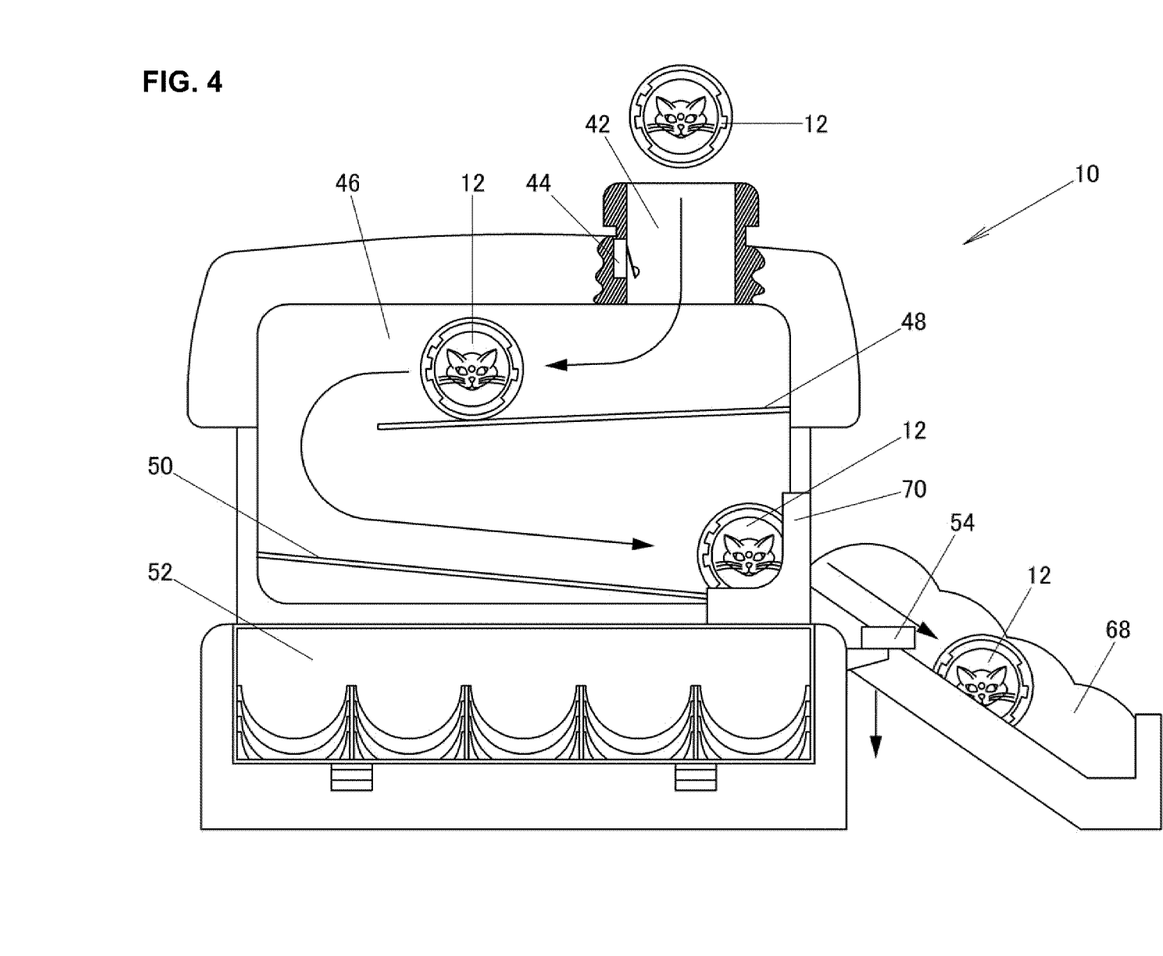
FIG. 4 is a diagram showing a toy main body of the intellectual training toy according to the invention.

Next, the toy main body 40 of the intellectual training toy 10 will be described using FIGS. 1 and 4. The toy main body 40 has a substantially rectangular parallelepiped shape. The insertion port 42 is formed at the upper portion of the toy main body 40 into which the disk 12 is inserted, and a discharge port 72 from which the disk 12 is discharged is formed on a right-hand side of the toy main body 40, and the discharge path 68 is formed so as to connect to the discharge port 72. Two sloping paths are formed at a front side upper portion in the toy main body 40, and the insertion port 42 connects to the sloping paths. An accommodation portion 52 for accommodating a plurality of disks 12 is formed at a front side lower portion in the toy main body 40.

A front side of the toy main body 40 is covered with a front panel 46 which is made up of a square or rectangular thin plate formed of a resin material having light transmission properties. A first sloping path 48 and a second sloping path 50 are formed in an upper position and a lower position, respectively, in the toy main body 40 on a rear side of the front panel 46 with a space defined as a width of the sloping paths so formed which is slightly larger than a thickness of the disk 12 so that the disk 12 is allowed to be held in an erected state while rolling down along the sloping paths. The first sloping path 48 makes up an inclined surface which is inclined downwards to the left and the second sloping path 50 makes up an inclined surface which is inclined downwards to the right. In this configuration, the disks 12 can be seen to roll down along the sloping paths from the front side of the toy main body 40.

The insertion port switch 44 is provided in an interior of the insertion port 42 which is formed at the upper portion of the toy main body 40. This insertion port switch 44 is activated when the disk 12 is inserted into the insertion port 42 and outputs an insertion signal to the control unit, which will be described later.

Figure 5:
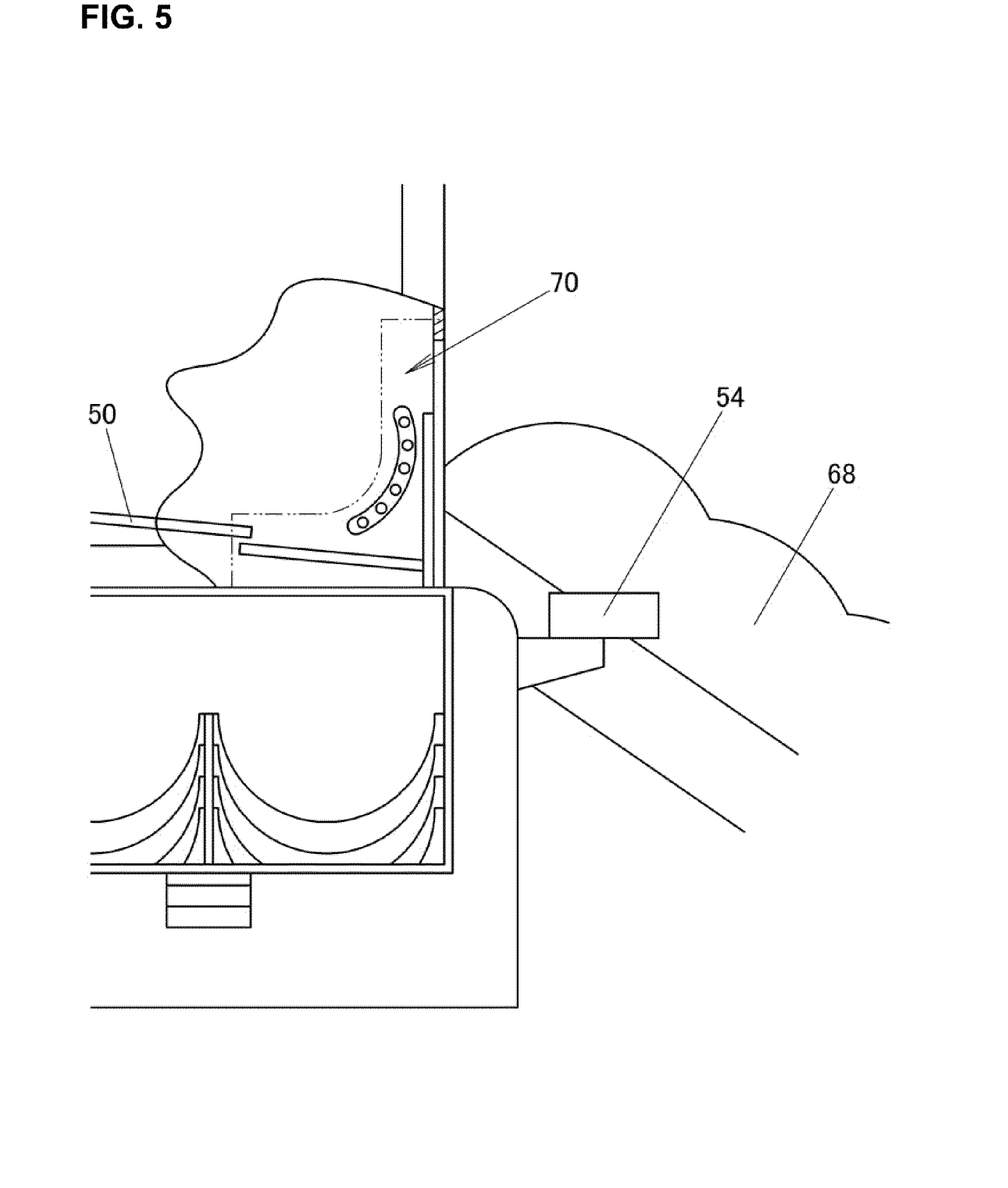
FIG. 5 is a diagram showing an identification unit of the intellectual training toy according to the invention.

As is shown in FIG. 5, the identification unit 70 is provided at the lowest position of the second sloping path 50. This identification unit 70 is made up of a light emitting device and a light receiving device, and the light emitting device is provided on a side of the identification unit 70 which faces the front panel 46 of the toy main body 40, while the light receiving device is installed in a position where it faces the light emitting device and which lies on a side which faces the sloping path. In the identification unit 70 of the embodiment, six light emitting devices and six light receiving devices are used, and six sets of light emitting and receiving devices are installed into an arc-like shape so as to match the lowest position where the disks 12 stop. The 64 combinations of recesses and projections of 6 bits can be identified by this identification unit 70.

This identification unit 70 is designed to perform an identifying operation based on a combination of light illuminating states and light interrupted states of the respective light emitting and receiving devices at a point in time when light is interrupted in any one or more sets of the six sets of light emitting and receiving devices. Namely, in the set of light emitting device and light receiving device which is situated at the recess portion of the disk 12, light emitted from the light emitting device is illuminating the light receiving device, whereas in the set of light emitting device and light receiving device which is situated at the projecting portion of the disk 12, light emitted from the light emitting device is being interrupted.

Figure 6:
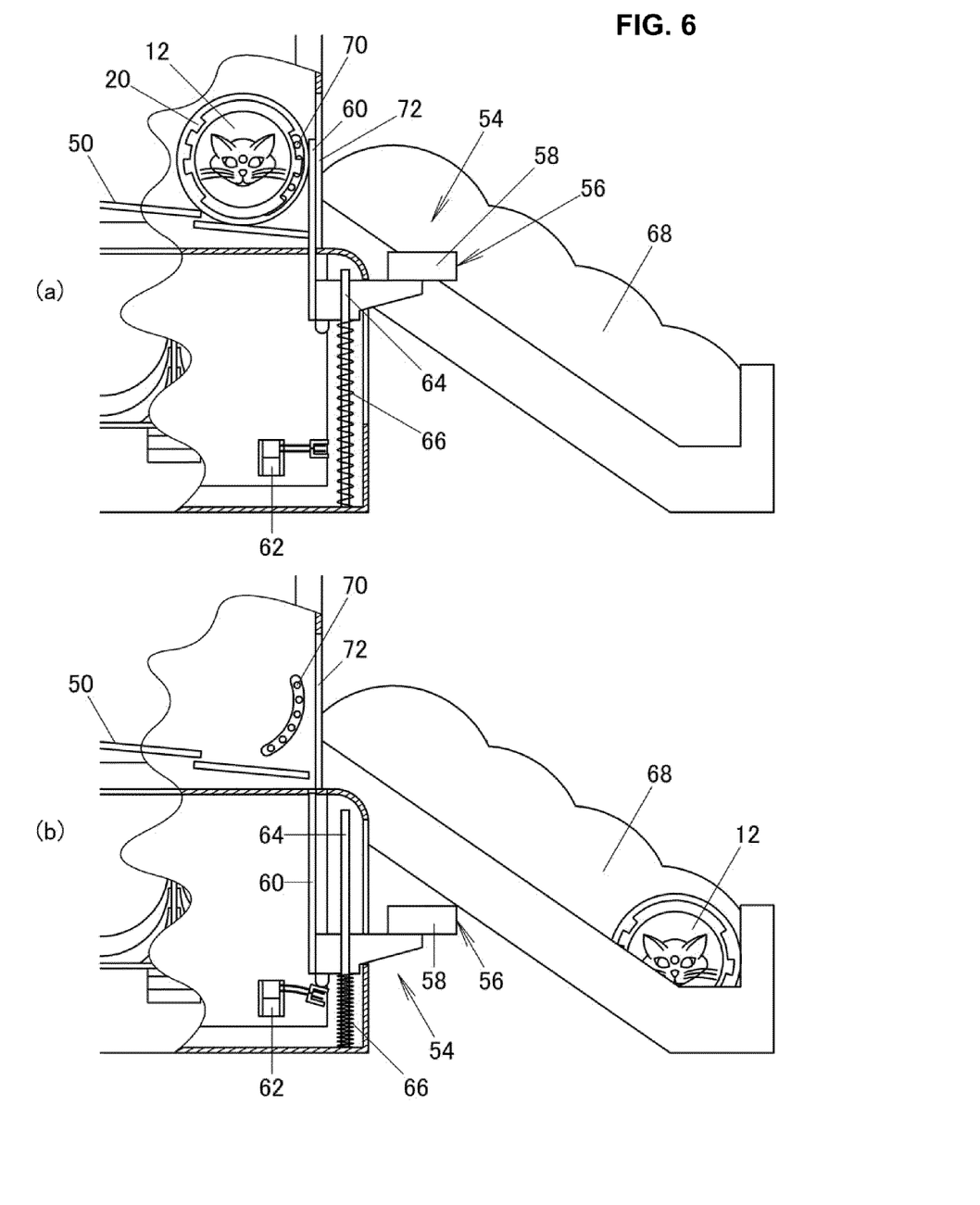
FIG. 6 shows diagrams explaining a disk discharge unit of the intellectual training toy according to the invention.

As is shown in FIG. 6, the disk discharge unit 54 is provided at the discharge port 72 provided on the right-hand side of the toy main body 40. This disk discharge unit 54 is made up of a discharge lever 56, the discharge port switch 62, a guide shaft 64, and a coil spring 66.

The discharge lever 56 of the disk discharge unit 54 is made up of the holding plate 60, which is square or rectangular and thin, which closes the discharge port 72, and a depressing portion 58 adapted to be depressed by the player. In this disk discharge unit 54, the discharge lever 56 is pivotally supported on the guide shaft 64, which will be described later, and when the depressing portion 58 is depressed by the player, the holding plate 60 which closes the discharge port 72 descends as the depressing portion 58 descends, whereby the discharge port 72 is designed to be opened. The discharge port switch 62 lying directly below the discharge lever 56 is activated as the discharge lever 56 descends, whereupon a discharge signal is outputted to the control unit, which will be described later, from the discharge port switch 62.

The guide shaft 64 is a rod-like shaft and is vertically secured to an interior bottom surface of the toy main body 40. The coil spring 66 is wound round the circumference of the guide shaft 64, and an upper end of the coil spring 66 is brought into abutment with the discharge lever 56, whereas a lower end thereof is brought into abutment with the interior bottom surface of the toy main body 40, whereby when the depressing portion 58 of the discharge lever 56 is depressed to thereby cause the discharge lever 56 to descend, the coil spring 66 is compressed. When the depressing force imposed on the discharge lever 56 is released, the discharge lever 56 is allowed to ascend by virtue of the restoring force of the coil spring 66.

In the disk discharge unit 54, as is shown in FIG. 6A, the disk 12 is retained within the identification unit 70 by the holding plate 60 of the disk discharge unit 54. However, since the discharge port 72 of the toy main body 40 is opened when the discharge lever 56 of the disk discharge unit 54 is depressed, the disk 12 so retained is then discharged to the discharge path 68 which is formed on the right-hand side of the toy main body 40, as is shown in FIG. 6B.

Although not shown, in the interior of the toy main body 40, a sound output unit which is a speaker, a power supply unit for supplying electric power to the toy main body 40, and a power supply switch are installed. In addition, a control circuit board is provided in the interior of the toy main body 40 on which a sound storage unit and a control unit are installed which are made up of a one-chip microcomputer which is made up of a memory and a CPU.

Further, a plurality of voice signals which produce voiced questions and voiced answers and music are stored on the sound storage unit installed on the control circuit board. As one example of a voiced question, for example, the player is asked a question, "How does a cat cry?" As one example of a voiced answer to the voiced question, a voice signal producing a crying noise of "mew" is stored. In addition, as voiced answers to voiced questions, voice signals for fake or imitation sounds of loud warning sounds produced by sirens of ambulances and police cars, a voiced answer to a voiced question, saying, "an answer is a cat." and the like are stored in the sound storage unit.

The number of required voiced questions and voiced answers stored on the sound storage unit is 64, which is the number of different pieces of information that can be discriminated by the toy main body 40. In the case of this embodiment, a maximum of 62 sets (of voiced questions and voiced answers) or 50 sets of voice signals resulting from pictures on the front and rear sides of 25 disks 12 are stored. For music, voice signals for a large number of pieces of music may be stored irrespective of the number of pieces of information that can be discriminated.

When the insertion port switch 44 is activated and an insertion signal is outputted, the control unit installed on the control circuit board reads out a voice signal for music from the sound storage unit and outputs the voice signal to the sound output unit. In addition, when the insertion signal is outputted, the control unit supplies electric power to the identification unit 70, waiting for an identification signal to be outputted from the identification unit 70. Thereafter, when an identification signal is outputted from the identification unit 70, the control unit reads out a voice signal for a required voiced question which corresponds to the identification signal from the sound storage unit and outputs the voice signal so read out to the sound output unit. Then, when the discharge port switch 62 is activated and a discharge signal is outputted, the control unit reads out a voice signal for a required voiced answer from the sound storage unit and outputs the voice signal so read out to the sound output unit. In addition, when a discharge signal is outputted, the control unit stops the supply of electric power to the identification unit 70 and puts the intellectual training toy 10 in a waiting mode until the insertion port switch 44 is activated again.

A series of operations performed by the intellectual training toy 10 will be described using FIGS. 4 and 6. The disk 12 inserted from the insertion port 42 into the toy main body 40 of the intellectual training toy 10 falls on the first sloping path 48. As this occurs, when the insertion port switch 44 provided in the interior of the insertion port 42 is activated and an insertion signal is outputted, a voice signal for music or the like is read out from the sound storage unit, and the voice signal so read out is outputted from the sound output unit in the form of music. In addition, in this intellectual training toy 10, by the insertion signal being outputted, electric power is supplied to the identification unit 70, and an identification signal is waited for to be outputted from the identification unit 70 by the control unit.

The disk 12 which has fallen on the first sloping path 48 rolls downwards to the left of the toy main body 40, and when the disk 12 runs over the first sloping path 48, the disk 12 then falls on the second sloping path 50 and then rolls downwards to the right of the toy main body 40. When the disk 12 reaches the lowest position where the identification unit 70 is situated, the disk 12 collides against the holding plate 60 which closes the discharge port 72, whereby the disk 12 stops. When the disk 12 rolls down along the first sloping path 48 and the second sloping path 50, since the inner plate 16 of the disk 12 to which the picture sheet 28 is affixed does not rotate by the action of the weight 24, the picture can be seen well, thereby making it possible to make the design of the intellectual training toy 10 more elaborate. In addition, when moving portions which operate in association with the passage of the disk 12 are provided on the first sloping path 48 and the second sloping path 50, the design of the intellectual training toy 10 can be made much more elaborate.

When the identification unit 70 identifies the disk 12 that has stopped to output an identification signal, a required voiced question corresponding to the disk 12 is read out of the sound storage unit and is then outputted from the sound output unit. Since the inner plate 16 is oriented towards a constant direction at all times by the weight 24 so that the weight 24 is disposed further downwards than the disk shaft 26, when identifying the identification portion 20 provided on the outer edge of the inner plate 16, the identification portion 20 can be identified correctly at all times.

When the discharge lever 56 is operated, the disk 12 is discharged to the discharge path 68 provided on the right-hand side of the toy main body 40. A discharge signal is outputted from the discharge port switch 62 by the discharge lever 56 being operated, and a voice signal for a required voiced answer corresponding to the disk 12 is read out of the sound storage unit, whereby a sound corresponding to a note of an animal illustrated on the disk 12 is outputted from the sound output unit. Thus, after having inserted the disk 12, the player can enjoy an intellectual training play in which a picture is guessed, a note of an animal is guessed or an imitation sound is guessed by listening to a voiced question from the toy main body 40 and then operating the discharge lever 56 to listen to a voiced answer to get to know whether the answer the player thought of is correct or wrong.

By configuring the intellectual training toy 10 in the way described heretofore, the intellectual training toy with more elaborate idea can be provided. While the invention has been described based on the preferred embodiment, the invention is not limited to the embodiment but can be modified variously as will be described below, for example.

Figure 7:
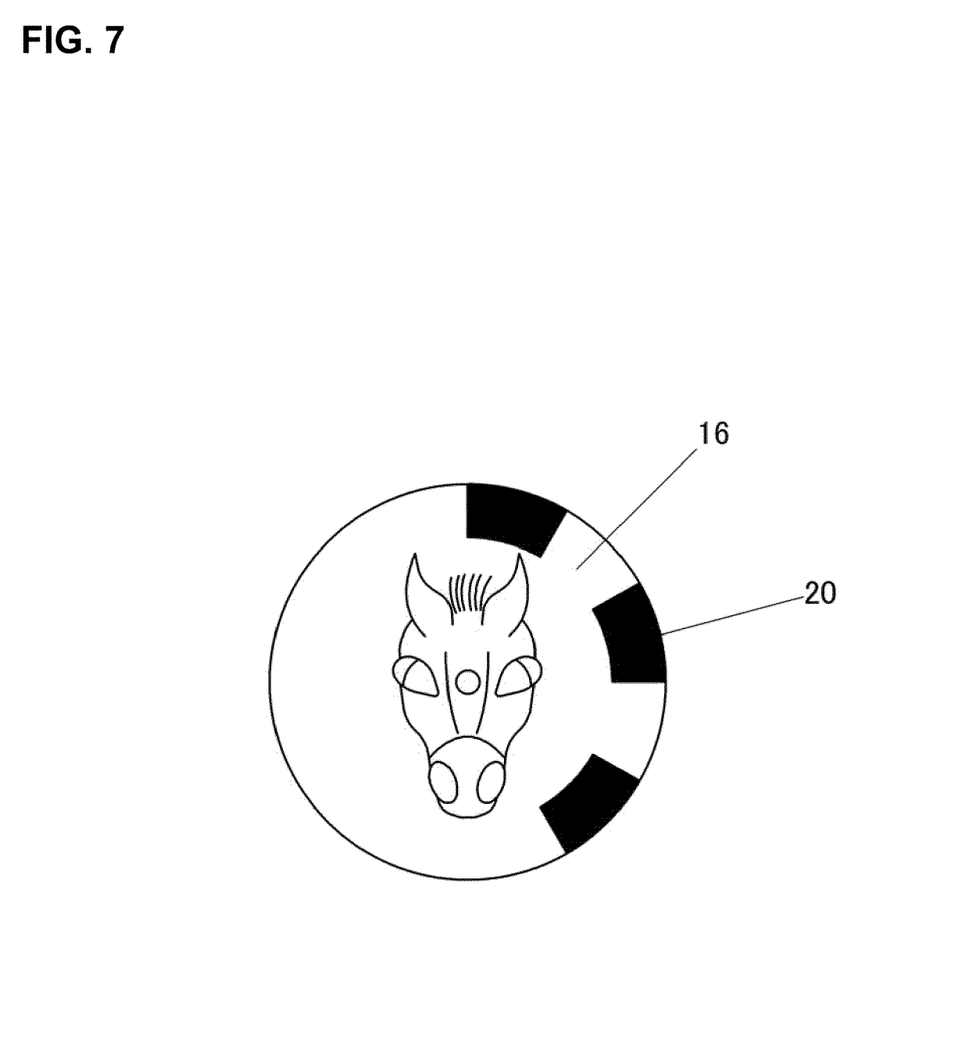
FIG. 7 is a diagram showing an identification portion of the disk of the intellectual training toy according to the invention.

For example, while the right-hand semi-circular edge portion of the disk 12 of the embodiment is divided into the six areas A to F to form a combination of recesses and projections, as is shown in FIG. 7, the right-hand semi-circular edge portion of the disk 12 may be divided into six areas A to F to form a combination of black-painted areas and white-painted areas. As this occurs, a reflective detector may be used to detect the existence or color of reflection light by illuminating the respective areas of the identification portion 20 to receive reflection light therefrom, so that the disk 12 is identified based on the results of detections of the existence or color of reflection light.

INDUSTRIAL APPLICABILITY

According to the embodiment, by the disk 12 being inserted into the toy main body 40, the voiced question corresponding to the picture illustrated on the disk 12 so inserted is outputted from the toy main body, and when the disk discharge unit 54 provided in the toy main body 40 is operated, a piece of music, an imitation sound or a note of an animal which corresponds to the voiced question made is outputted from the toy main body 40, thereby making it possible to provide the intellectual training toy with more elaborate idea.

What is claimed is:

1. An intellectual training toy comprising: a plurality of disks having an identification portion and a toy main body into which a player inserts the disks, wherein the toy main body comprises an insertion port into which the disks are inserted, a sloping path making up an inclined surface along which the disks are allowed to roll down while being erected, a holding plate formed at a lowest position of the sloping path for holding the disks, and a discharge port through which the disks are discharged from the toy main body, the toy main body comprising further an insertion port switch for detecting the insertion of the disks to output insertion signals, an identification unit for identifying the identification portions of the disks to output identification signals, a sound storage unit for storing a plurality of voice signals which produce voiced questions and voiced answers and music, a sound output unit for outputting voiced information and music, a disk discharge unit for discharging the disks from the toy main body, a discharge port switch for outputting a discharge signal when the disk discharge unit is activated, and a control unit for reading out required voice signals based on the insertion signals, identification signals, and discharge signals from the sound storage unit to output the voice signals to read out to the sound output unit.

2. An intellectual training toy as set forth in claim 1, wherein
the disks each comprise outer cylindrical elements which have a hollow portion, which are formed into a coin-like shape, and which have light transmission properties, a thin disk-like inner plate which is accommodated in the hollow portions of the outer cylindrical elements and which is pivoted so as to rotate in an interior space defined by the outer cylindrical elements, and a weight which is secured to an outer edge of the inner plate and which is located in a lower position of a rotating shaft of the inner plate to thereby suppress the rotation of the inner plate.

3. An intellectual training toy as set forth in claim 2, wherein
a picture or pictures are shown on one side or both sides of the inner plate.

4. An intellectual training toy as set forth in claim 3, wherein
recesses and projections are formed on an outermost edge of the inner plate to make up an identification portion.

5. An intellectual training toy as set forth in claim 3, wherein
the outermost edge of the inner plate is colored to make up an identification portion.

6. An intellectual training toy as set forth in claim 4, wherein
the inner plate has identification portions on outermost edges of both a right-hand semi-circular edge portion and a left-hand semi-circular edge portion thereof.

7. An intellectual training toy as set forth in claim 5, wherein
the inner plate has identification portions on outermost edges of both a right-hand semi-circular edge portion and a left-hand semi-circular edge portion thereof.

* * * * *